(12) United States Patent
Gallagher et al.

(10) Patent No.: US 10,890,195 B2
(45) Date of Patent: *Jan. 12, 2021

(54) GAS TURBINE ENGINE AIRFOIL

(71) Applicant: RAYTHEON TECHNOLOGIES CORPORATION, Farmington, CT (US)

(72) Inventors: Edward J. Gallagher, West Hartford, CT (US); Lisa I. Brilliant, Middletown, CT (US); Joseph C. Straccia, Middletown, CT (US); Stanley J. Balamucki, The Villages, FL (US); Mark A. Stephens, Wethersfield, CT (US); Kate Hudon, Superior, CO (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/667,321

(22) Filed: Oct. 29, 2019

(65) Prior Publication Data

US 2020/0173463 A1 Jun. 4, 2020

Related U.S. Application Data

(63) Continuation of application No. 15/114,503, filed as application No. PCT/US2015/016135 on Feb. 17, 2015, now Pat. No. 10,495,106.

(Continued)

(51) Int. Cl.
*F04D 29/54* (2006.01)
*F04D 29/32* (2006.01)
(Continued)

(52) U.S. Cl.
CPC .......... *F04D 29/544* (2013.01); *F01D 5/141* (2013.01); *F02C 7/36* (2013.01); *F02K 3/072* (2013.01);
(Continued)

(58) Field of Classification Search
CPC ....... F04D 29/324; F04D 29/544; F01D 5/141
See application file for complete search history.

(56) References Cited

U.S. PATENT DOCUMENTS 2,258,792 A 4/1941 New
2,714,499 A 8/1955 Warner
(Continued)

FOREIGN PATENT DOCUMENTS

DE 1903642 8/1970
DE 1903642 A1 8/1970
(Continued)

OTHER PUBLICATIONS

Mitra, A. "What is the difference between turbine and compressor blades, and why is so?", Oct. 30, 2017. Accessed from https://www.quora.com/What-is-the-difference-between-turbine-and-compressor-blade-design-and-why-is-so#:~:text=Note%20also%20that%20a%20compressor,jet%20engine)%20is%20very%20hot. (Year: 2017).*
(Continued)

*Primary Examiner* — Michael Lebentritt
*Assistant Examiner* — Topaz L. Elliott
(74) *Attorney, Agent, or Firm* — Carlson, Gaskey & Olds, P.C.

(57) ABSTRACT

A compressor airfoil of a turbine engine that has a geared architecture includes pressure and suction sides and extends in a radial direction from a 0% span position to a 100% span position. The airfoil has a relationship between a trailing edge angle and span position that defines a curve with a
(Continued)

non-negative slope from 0% span to 20% span corresponding to a non-decreasing trailing edge angle.

16 Claims, 5 Drawing Sheets

Related U.S. Application Data

(60) Provisional application No. 61/941,617, filed on Feb. 19, 2014.

(51) Int. Cl.
    *F01D 5/14*     (2006.01)
    *F02K 3/072*     (2006.01)
    *F02C 7/36*     (2006.01)

(52) U.S. Cl.
    CPC .... *F04D 29/324* (2013.01); *F05D 2220/3217* (2013.01); *F05D 2240/122* (2013.01); *F05D 2240/304* (2013.01); *F05D 2260/40311* (2013.01); *Y02T 50/60* (2013.01)

(56) References Cited

U.S. PATENT DOCUMENTS

| | | |
|---|---|---|
| 2,746,672 A | 5/1956 | Doll, Jr. |
| 2,934,259 A | 4/1960 | Hausmann |
| 2,936,655 A | 5/1960 | Peterson et al. |
| 3,021,731 A | 2/1962 | Stoeckicht |
| 3,194,487 A | 7/1965 | Tyler et al. |
| 3,287,906 A | 11/1966 | McCormick |
| 3,352,178 A | 11/1967 | Lindgren et al. |
| 3,412,560 A | 11/1968 | Gaubatz |
| 3,664,612 A | 5/1972 | Skidmore et al. |
| 3,747,343 A | 7/1973 | Rosen |
| 3,754,484 A | 8/1973 | Roberts |
| 3,765,623 A | 10/1973 | Donelson et al. |
| 3,820,719 A | 6/1974 | Clark |
| 3,843,277 A | 10/1974 | Ehrich |
| 3,867,062 A | 2/1975 | Troller |
| 3,892,358 A | 7/1975 | Gisslen |
| 3,903,690 A | 9/1975 | Jones |
| 3,905,191 A | 9/1975 | Matto |
| 3,932,058 A | 1/1976 | Harner et al. |
| 3,935,558 A | 1/1976 | Miller et al. |
| 3,988,889 A | 11/1976 | Chamay et al. |
| 4,012,172 A | 3/1977 | Schwaar et al. |
| 4,130,872 A | 12/1978 | Harloff |
| 4,220,171 A | 9/1980 | Ruehr |
| 4,240,250 A | 12/1980 | Harris |
| 4,284,174 A | 8/1981 | Salvana et al. |
| 4,284,388 A | 8/1981 | Szewalski |
| 4,289,360 A | 9/1981 | Zirin |
| 4,431,376 A | 2/1984 | Lubenstein et al. |
| 4,478,551 A | 10/1984 | Honeycutt, Jr. et al. |
| 4,649,114 A | 3/1987 | Miltenburger et al. |
| 4,682,935 A | 7/1987 | Martin |
| 4,696,156 A | 9/1987 | Burr et al. |
| 4,722,357 A | 2/1988 | Wynosky |
| 4,826,400 A | 5/1989 | Gregory |
| 4,900,230 A | 2/1990 | Patel |
| 4,979,362 A | 12/1990 | Vershure, Jr. |
| 5,058,617 A | 10/1991 | Stockman et al. |
| 5,088,892 A | 2/1992 | Weingold et al. |
| 5,102,379 A | 4/1992 | Pagluica et al. |
| 5,141,400 A | 8/1992 | Murphy et al. |
| 5,152,661 A | 10/1992 | Sheets |
| 5,167,489 A | 12/1992 | Wadia et al. |
| 5,192,190 A | 3/1993 | Ferleger |
| 5,211,703 A | 5/1993 | Ferleger |
| 5,221,181 A | 6/1993 | Ferleger |
| 5,277,549 A | 1/1994 | Chen et al. |
| 5,317,877 A | 6/1994 | Stuart |
| 5,361,580 A | 11/1994 | Ciokajlo et al. |
| 5,433,674 A | 7/1995 | Sheridan et al. |
| 5,443,367 A | 8/1995 | Samit et al. |
| 5,447,411 A | 9/1995 | Curley et al. |
| 5,466,198 A | 11/1995 | McKibbin et al. |
| 5,524,341 A | 6/1996 | Ferleger |
| 5,524,847 A | 6/1996 | Brodell et al. |
| 5,525,038 A | 6/1996 | Sharma et al. |
| 5,624,234 A | 4/1997 | Neely et al. |
| 5,634,767 A | 6/1997 | Dawson |
| 5,642,985 A | 7/1997 | Spear et al. |
| 5,677,060 A | 10/1997 | Terentieva et al. |
| 5,725,354 A | 3/1998 | Wadia et al. |
| 5,778,659 A | 7/1998 | Duesler et al. |
| 5,779,443 A | 7/1998 | Haller et al. |
| 5,785,498 A | 7/1998 | Quinn et al. |
| 5,857,836 A | 1/1999 | Stickler et al. |
| 5,915,917 A | 6/1999 | Eveker et al. |
| 5,975,841 A | 11/1999 | Lindemuth et al. |
| 5,985,470 A | 11/1999 | Spitsberg et al. |
| 6,059,532 A | 5/2000 | Chen et al. |
| 6,071,077 A | 6/2000 | Rowlands |
| 6,079,948 A | 6/2000 | Sasaki et al. |
| 6,195,983 B1 | 3/2001 | Wadia |
| 6,223,616 B1 | 5/2001 | Sheridan |
| 6,299,412 B1 | 10/2001 | Wood et al. |
| 6,312,219 B1 | 11/2001 | Wood et al. |
| 6,315,815 B1 | 11/2001 | Spadaccini et al. |
| 6,318,070 B1 | 11/2001 | Rey et al. |
| 6,328,533 B1 | 12/2001 | Decker et al. |
| 6,331,100 B1 | 12/2001 | Liu et al. |
| 6,341,942 B1 | 1/2002 | Chou et al. |
| 6,387,456 B1 | 5/2002 | Eaton, Jr. et al. |
| 6,517,341 B1 | 2/2003 | Brun et al. |
| 6,565,334 B1 | 5/2003 | Bradbury |
| 6,607,165 B1 | 8/2003 | Manteiga et al. |
| 6,709,233 B2 | 3/2004 | Haller |
| 6,709,492 B1 | 3/2004 | Spadaccini et al. |
| 6,814,541 B2 | 11/2004 | Evans et al. |
| 6,883,303 B1 | 4/2005 | Seda |
| 6,899,526 B2 | 5/2005 | Doloresco et al. |
| 6,994,524 B2 | 2/2006 | Owen et al. |
| 7,021,042 B2 | 4/2006 | Law |
| 7,114,911 B2 | 10/2006 | Martin et al. |
| 7,219,490 B2 | 1/2007 | Dev |
| 7,204,676 B2 | 4/2007 | Dutton et al. |
| 7,328,580 B2 | 2/2008 | Lee et al. |
| 7,374,403 B2 | 5/2008 | Decker et al. |
| 7,396,205 B2 | 7/2008 | Dube et al. |
| 7,476,086 B2 | 1/2009 | Wadia et al. |
| 7,497,664 B2 | 3/2009 | Walter et al. |
| 7,547,186 B2 | 6/2009 | Schuster et al. |
| 7,574,854 B2 | 8/2009 | Moniz |
| 7,591,754 B2 | 9/2009 | Duong et al. |
| 7,632,064 B2 | 12/2009 | Somanath |
| 7,662,059 B2 | 2/2010 | McCune |
| 7,694,505 B2 | 4/2010 | Schilling |
| 7,785,075 B2 | 8/2010 | Botrel et al. |
| 7,806,651 B2 | 10/2010 | Kennepohl et al. |
| 7,806,653 B2 | 10/2010 | Burton et al. |
| 7,824,305 B2 | 11/2010 | Duong et al. |
| 7,828,682 B2 | 11/2010 | Smook |
| 7,926,260 B2 | 4/2011 | Sheridan et al. |
| 7,967,571 B2 | 6/2011 | Wood et al. |
| 7,997,868 B1 | 8/2011 | Liang et al. |
| 7,997,872 B2 | 8/2011 | Wilson |
| 7,997,882 B2 | 8/2011 | Shulver |
| 8,015,798 B2 | 9/2011 | Norris et al. |
| 8,087,885 B2 | 1/2012 | Suciu et al. |
| 8,147,207 B2 | 4/2012 | Orosa et al. |
| 8,167,548 B2 | 5/2012 | Greim |
| 8,167,567 B2 | 5/2012 | Kirchner et al. |
| 8,177,496 B2 | 5/2012 | Wilson et al. |
| 8,192,153 B2 | 6/2012 | Harvey et al. |
| 8,205,432 B2 | 6/2012 | Sheridan |
| 8,246,292 B1 | 8/2012 | Morin et al. |
| RE43,710 E | 10/2012 | Spear et al. |
| 8,382,438 B2 | 2/2013 | Guemmer |
| 8,393,870 B2 | 3/2013 | Nash et al. |
| 8,464,426 B2 | 6/2013 | Kirchner et al. |

(56) References Cited

U.S. PATENT DOCUMENTS

| | | | |
|---|---|---|---|
| 8,678,757 B2 | 3/2014 | Li | |
| 8,864,457 B2 | 10/2014 | Malandra et al. | |
| 9,004,850 B2 | 4/2015 | Nichols et al. | |
| 9,506,348 B2* | 11/2016 | Bertini | F01D 5/145 |
| 2002/0141863 A1 | 10/2002 | Liu | |
| 2003/0086788 A1 | 5/2003 | Chandraker | |
| 2003/0163983 A1 | 9/2003 | Seda et al. | |
| 2004/0091353 A1 | 5/2004 | Shahpar et al. | |
| 2005/0031454 A1 | 2/2005 | Doloresco et al. | |
| 2005/0169761 A1 | 8/2005 | Dube et al. | |
| 2005/0254956 A1 | 11/2005 | Dutton et al. | |
| 2006/0210395 A1 | 9/2006 | Schuster et al. | |
| 2006/0222488 A1 | 10/2006 | Fessou | |
| 2006/0228206 A1 | 10/2006 | Decker | |
| 2007/0041841 A1 | 2/2007 | Walter et al. | |
| 2007/0160478 A1 | 7/2007 | Jarrah et al. | |
| 2007/0201983 A1 | 8/2007 | Arinci et al. | |
| 2007/0243068 A1 | 10/2007 | Wadia et al. | |
| 2008/0003096 A1 | 1/2008 | Kohli et al. | |
| 2008/0101959 A1 | 5/2008 | McRae et al. | |
| 2008/0107538 A1 | 5/2008 | Bois et al. | |
| 2008/0116009 A1 | 5/2008 | Sheridan et al. | |
| 2008/0120839 A1 | 5/2008 | Schilling | |
| 2008/0131271 A1 | 6/2008 | Wood et al. | |
| 2008/0148564 A1 | 6/2008 | Burton et al. | |
| 2008/0226454 A1 | 9/2008 | Decker et al. | |
| 2008/0317588 A1 | 12/2008 | Grabowski et al. | |
| 2009/0056343 A1 | 3/2009 | Suciu et al. | |
| 2009/0226322 A1 | 9/2009 | Clemen | |
| 2009/0257866 A1 | 10/2009 | Greim | |
| 2009/0274554 A1 | 11/2009 | Guemmer | |
| 2009/0297355 A1 | 12/2009 | Herr et al. | |
| 2009/0304518 A1 | 12/2009 | Kodama et al. | |
| 2009/0314881 A1 | 12/2009 | Suciu et al. | |
| 2009/0317227 A1 | 12/2009 | Grover et al. | |
| 2010/0054946 A1 | 3/2010 | Orosa | |
| 2010/0105516 A1 | 4/2010 | Sheridan et al. | |
| 2010/0148396 A1 | 6/2010 | Xie et al. | |
| 2010/0212281 A1 | 8/2010 | Sheridan | |
| 2010/0215503 A1 | 8/2010 | Myoren et al. | |
| 2010/0218483 A1 | 9/2010 | Smith | |
| 2010/0232970 A1 | 9/2010 | Murooka et al. | |
| 2010/0254797 A1 | 10/2010 | Grover et al. | |
| 2010/0260609 A1 | 10/2010 | Wood et al. | |
| 2010/0331139 A1 | 12/2010 | McCune | |
| 2011/0081252 A1 | 4/2011 | Li | |
| 2011/0116917 A1 | 5/2011 | Wang et al. | |
| 2011/0135482 A1 | 6/2011 | Nash et al. | |
| 2011/0150660 A1 | 6/2011 | Micheli | |
| 2011/0159797 A1 | 6/2011 | Beltman et al. | |
| 2011/0206527 A1 | 8/2011 | Harvey et al. | |
| 2011/0225979 A1 | 9/2011 | Hoeger et al. | |
| 2011/0268578 A1 | 11/2011 | Praisner et al. | |
| 2011/0286850 A1 | 11/2011 | Micheli et al. | |
| 2011/0286856 A1 | 11/2011 | Micheli | |
| 2011/0293423 A1 | 12/2011 | Bunker et al. | |
| 2012/0057982 A1 | 3/2012 | O'Hearn et al. | |
| 2012/0124964 A1 | 5/2012 | Hasel et al. | |
| 2012/0195767 A1 | 8/2012 | Gervais et al. | |
| 2012/0237344 A1 | 9/2012 | Wood et al. | |
| 2012/0243975 A1 | 9/2012 | Breeze-Stringfellow | |
| 2012/0243983 A1 | 9/2012 | Breeze-Stringfellow et al. | |
| 2012/0244005 A1 | 9/2012 | Breeze-Stringfellow et al. | |
| 2013/0008170 A1 | 1/2013 | Gallagher et al. | |
| 2013/0022473 A1 | 1/2013 | Tran | |
| 2013/0089415 A1 | 4/2013 | Brown | |
| 2013/0141935 A1 | 6/2013 | Huang | |
| 2013/0149108 A1 | 6/2013 | Webster | |
| 2013/0164488 A1 | 6/2013 | Wood et al. | |
| 2013/0189117 A1 | 7/2013 | Baltas et al. | |
| 2013/0192199 A1 | 8/2013 | Merry et al. | |
| 2013/0192261 A1 | 8/2013 | Mayer et al. | |
| 2013/0192266 A1 | 8/2013 | Houston | |
| 2013/0202403 A1 | 8/2013 | Morin et al. | |
| 2013/0219859 A1 | 8/2013 | Suciu | |
| 2013/0219922 A1 | 8/2013 | Gilson et al. | |
| 2013/0224040 A1 | 8/2013 | Straccia | |
| 2013/0259668 A1 | 10/2013 | Myoren et al. | |
| 2013/0266451 A1 | 10/2013 | Pesteil et al. | |
| 2013/0287542 A1 | 10/2013 | Nichols et al. | |
| 2013/0315739 A1 | 11/2013 | Cellier | |
| 2013/0340406 A1 | 12/2013 | Gallagher et al. | |
| 2014/0030060 A1 | 1/2014 | Magowan | |
| 2014/0248155 A1 | 9/2014 | Merville et al. | |
| 2014/0298651 A1* | 10/2014 | Bertini | F01D 5/141 29/889.7 |
| 2014/0341749 A1 | 11/2014 | Perrot et al. | |
| 2015/0017012 A1 | 1/2015 | Pouzadoux et al. | |
| 2015/0118059 A1 | 4/2015 | Perrot | |
| 2015/0354367 A1 | 12/2015 | Gallagher et al. | |
| 2016/0195104 A1 | 7/2016 | Cellier | |
| 2016/0363128 A1 | 12/2016 | Gallagher et al. | |

FOREIGN PATENT DOCUMENTS

| | | |
|---|---|---|
| DE | 102008055824 | 5/2009 |
| EP | 0082100 | 6/1983 |
| EP | 0251978 A | 1/1988 |
| EP | 0661413 A1 | 7/1995 |
| EP | 0745755 A2 | 12/1996 |
| EP | 0774567 | 5/1997 |
| EP | 0791383 | 8/1997 |
| EP | 1074700 A2 | 2/2001 |
| EP | 1098092 A2 | 5/2001 |
| EP | 1106835 A2 | 6/2001 |
| EP | 1106836 | 6/2001 |
| EP | 1106836 A2 | 6/2001 |
| EP | 1111188 A2 | 6/2001 |
| EP | 1142850 | 10/2001 |
| EP | 1505302 | 2/2005 |
| EP | 1505302 A1 | 2/2005 |
| EP | 1508669 A1 | 2/2005 |
| EP | 1524405 A2 | 4/2005 |
| EP | 1582695 | 10/2005 |
| EP | 1939399 A2 | 7/2008 |
| EP | 0801230 | 5/2009 |
| EP | 2075408 A2 | 7/2009 |
| EP | 2133573 A1 | 12/2009 |
| EP | 2226468 | 9/2010 |
| EP | 2226468 A2 | 9/2010 |
| EP | 1930598 | 8/2012 |
| EP | 2535527 | 12/2012 |
| EP | 2543818 | 1/2013 |
| EP | 2543818 A2 | 1/2013 |
| EP | 2631491 A1 | 8/2013 |
| EP | 2995771 | 3/2016 |
| GB | 1516041 | 6/1978 |
| GB | 2041090 | 9/1980 |
| GB | 2170868 A | 8/1986 |
| GB | 2426792 | 12/2006 |
| GB | 2431697 | 5/2007 |
| JP | H08165999 | 6/1996 |
| JP | 2014015858 | 1/2014 |
| WO | 2007001389 | 1/2007 |
| WO | 2007038674 | 4/2007 |
| WO | 2008109036 A1 | 9/2008 |
| WO | 2009103528 | 8/2009 |
| WO | 2014066503 A1 | 5/2014 |
| WO | 2015126449 A1 | 8/2015 |
| WO | 2015126774 | 8/2015 |

OTHER PUBLICATIONS

Sharma, J. and Mitra, A. "Why is there difference in blade cross section of turbine and compressor blades? Why turbine blades are more curved than compressor?" Dec. 27, 2017. Accessed from https://www.quora.com/ (Year: 2017).*

Winn, A. (Ed). (1990). Wide Chord Fan Club. Flight International, 4217(137). May 23-29, 1990. pp. 34-38.

Parker, R.G. and Lin, J. (2001). Modeling, modal properties, and mesh stiffness variation instabilities of planetary gears. Prepared for NASA. NASA/CR-2001-210939. May 2001. pp. 1-111.

(56) References Cited

OTHER PUBLICATIONS

Mancuso, J.R. and Corcoran, J.P. (2003). What are the differences in high performance flexible couplings for turbomachinery? Proceedings of the Thirty-Second Turbomachinery Symposium. 2003. pp. 189-207.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Product Brochure. Garrett TFE731. Allied Signal. Copyright 1987. pp. 1-24.
Honeywell Learjet 31 and 35/36 TFE731-2 to 2C Engine Upgrade Program. Sep. 2005. pp. 1-4.
Honeywell Sabreliner 65 TFE731-3 to -3D Engine Upgrade Program. Oct. 2005. pp. 1-4.
U.S. Department of Transportation: Federal Aviation Administration Type Certificate Data Sheet No. E6WE. Dated: May 9, 2000. p. 1-9.
Kurzke, J. (2012). GasTurb 12: Design and off-design performance of gas turbines. Retrieved from: https://www.scribd.com/document/153900429/GasTurb-12.
Ahmad, F. and Mizramoghadam, A.V. (1999). Single v. two stage high pressure turbine design of modern aero engines. ASME. Presented at the International Gas Turbine & Aeroengine Congress & Exhibition. Indianapolis, Indiana. Jun. 7-10, 1999. pp. 1-9.
Riegler, C., and Bichlmaier, C. (2007). The geared turbofan technology—Opportunities, challenges and readiness status. Porceedings CEAS. Sep. 10-13, 2007. Berlin, Germany. pp. 1-12.
About GasTurb. Retrieved Jun. 26, 2018 from: http://gasturb.de/about-gasturb.html.
Kurzke, J. (2001). GasTurb 9: A program to calculate design and off-design performance of gas turbines. Retrieved from: https://www.scribd.com/document/92384867/GasTurb9Manual.
Tummers, B. (2006). DataThief III. Retreived from: https://datathief.org/DatathiefManual.pdf pp. 1-52.
Manual. Student's Guide to Learning SolidWorks Software. Dassault Systemes—SolidWorks Corporation. pp. 1-156.
Macisaac, B. and Langston, R. (2011). Gas turbine propulsion systems. Chichester, West Sussex: John Wiley & Sons, Ltd. pp. 260-265.
Datasheet. CFM56-5B for the Airbus A320ceo family and CFM56-7B for the Boeing 737 family. https://www.cfmaeroengines.com/.
Turner, M. G., Norris, A., and Veres, J.P. (2004). High-fidelity three-dimensional simulation of the GE90. NASA/TM-2004-212981. pp. 1-18.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Amezketa, M., Iriarte, X., Ros, J., and Pintor, J. (2009). Dynamic model of a helical gear pair with backlash and angle0varying mesh stiffness. Multibody Dynamics 2009, ECCOMAS Thematic Conference. 2009. pp. 1-36.
Singh, A. (2005). Application of a system level model to study the planetary load sharing behavior. Jounal of Mechanical Design. vol. 127. May 2005. pp. 469-476.
Smith-Boyd, L. and Pike, J. (1986). Expansion of epicyclic gear dynamic analysis program. Prepared for NASA. NASA CR-179563. Aug. 1986. pp. 1-98.
Wikipedia. Torsion spring. Retreived Jun. 29, 2018 from: https://en.wikipedia.org/wiki/Torsion_spring.
AGMA Standard (2006). Design manual for enclosed epicyclic gear drives. Alexandria, VA: American Gear Manufacturers Association. pp. 1-104.
AGMA Standard (1997). Design and selection of components for enclosed gear drives. lexandria, VA: American Gear Manufacturers Association. pp. 1-48.

Daly, M. Ed. (2007). Jane's Aero-Engine. Issue Twenty-three. Mar. 2008. p. 707-12.
AGMA Standard (1999). Flexible couplings—Mass elastic properties and other characteristics. Alexandria, VA: American Gear Manufacturers Association. pp. 1-46.
Wikipedia. Stiffness. Retrieved Jun. 28, 2018 from: https://en.wikipedia.org/wiki/Stiffness.
Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing Company, Inc. pp. 400-406.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Gray, D.E. and Gardner, W.B. (1983). Energy efficient engine program technology benefit/cost study—vol. 2. NASA CR-174766. Oct. 1983. pp. 1-118.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL May 1-4, 1994. pp. 1-10.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Howe, D.C., and Wynosky, T.A. (1985). Energy efficient engine program advanced turbofan nacelle definition study. NASA-CR-174942. May 1985. pp. 1-60.
Howe, D.C., and Wynosky, T.A. (1985). Energy efficient engine program advanced turbofan nacelle definition study. NASA-CR-174942. May 1985. University of Washington dated Dec. 13, 1990. pp. 1-14.
Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.
Mattingly, J.D. (1996). Elements of gas turbine propulsion. New York, New York: McGraw-Hill, Inc. pp. 1-18, 60-62, 223-234, 462-479, 517-520, 757-767, and 862-864.
Extended EP Search report for EP Application No. 15793193.2 dated May 12, 2017.
International Preliminary Report on Patentability for PCT Application No. PCT/US2015/016135, dated Sep. 1, 2016.
Extended European Search Report for European Application No. 14882896.5 dated Oct. 19, 2017.
Extended European Search Report for European Application No. 14883503.6 dated Nov. 6, 2017.
Extended European Search Report for European Application No. 15752013.1 dated Dec. 5, 2017.
Extended European Search Report for European Application No. 15751617.0 dated Dec. 5, 2017.
Extended European Search Report for European Application No. 15793127.0 dated Dec. 1, 2017.
Extended European Search Report for European Application No. 15792720.3 dated Oct. 17, 2017.

(56) References Cited

OTHER PUBLICATIONS

The International Search Report and Written Opinion for PCT Application No. PCT/US2015/016187, dated May 20, 2015.
The International Search Report and Written Opinion for PCT Application No. PCT/US2015/016011, dated May 21, 2015.
The International Search Report and Written Opinion for PCT Application No. PCT/US2015/016078, dated May 29, 2015.
The International Search Report and Written Opinion for PCT Application No. PCT/US2015/016154, dated May 22, 2015.
The International Search Report and Written Opinion for PCT Application No. PCT/US2015/016086, dated May 26, 2015.
The International Search Report and Written Opinion for PCT Application No. PCT/US2015/016554, dated May 26, 2015.
The International Search Report and Written Opinion for PCT Application No. PCT/US2015/015554, dated May 21, 2015.
The International Search Report and Written Opinion for PCT Application No. PCT/US2014/052325, dated May 29, 2015.
The International Search Report and Written Opinion for PCT Application No. PCT/US2015/016378, dated May 29, 2015.
The International Search Report and Written Opinion for PCT Application No. PCT/US2014/052293, dated May 29, 2015.
The International Search Report and Written Opinion for PCT Application No. PCT/US2014/052516, dated Jun. 10, 2015.
Intentional Search Report and Written Opinion for PCT Application PCT/US2014/052447 dated Dec. 8, 2014.
Intentional Search Report and Written Opinion for PCT Application PCT/US2014/052441 dated Dec. 12, 2014.
Intentional Search Report and Written Opinion for PCT Application PCT/US2014/052282 dated Dec. 5, 2014.
Intentional Search Report and Written Opinion for PCT Application PCT/US2014/052474 dated Dec. 5, 2014.
Intentional Search Report and Written Opinion for PCT Application PCT/US2014/052434 dated Nov. 27, 2014.
Intentional Search Report and Written Opinion for PCT Application PCT/US2014/052468 dated Dec. 12, 2014.
Intentional Search Report and Written Opinion for PCT Application PCT/US2015/016083 dated Jul. 21, 2015.
Intentional Search Report and Written Opinion for PCT Application PCT/US2014/052440 dated Nov. 27, 2014.
Intentional Search Report and Written Opinion for PCT Application PCT/US2014/052437 dated Dec. 26, 2014.
Intentional Search Report and Written Opinion for PCT Application PCT/US2014/052238 dated Dec. 11, 2014.
Intentional Search Report and Written Opinion for PCT Application PCT/US2014/052080 dated Aug. 21, 2014.
Intentional Search Report and Written Opinion for PCT Application PCT/US2014/052096 dated Nov. 28, 2014.
Aerodynamic Design technique for Optimizing Fan Blade Spacing, Rogalsky et all., Proceedings of the 7th Annual Conference of the Computational Fluid Dynamics Society of Canada, 1999.
Turbine Design and Application. vol. 2. NASA, 1973.
Analytical Parametric Investigation of Low Pressure Ration Fan, NASA, 1973 Metzger et al.
Oyama et al., Multiobjective Optimization of a Multi-Stage Compressor Using Evolutionary Algorithm, NASA, 2002, AIAA 2002-3535 pp. 1-11.
The International Search Report and Written Opinion for PCT Application No. PCT/US2015/016083, dated Jul. 21, 2015.
Editors of Encyclopedia Britannica. "Curve: Mathematics" accessed on Apr. 10, 2019 from https://www.britannica.com/science/curve (Year: 2019).
International Preliminary Report on Patentability for PCT Application No. PCT/US2014/052282, dated Sep. 1, 2016.
International Preliminary Report on Patentability for PCT Application No. PCT/US2015/016554, dated Sep. 1, 2016.
International Preliminary Report on Patentability for PCT Application No. PCT/US2014/052434, dated Sep. 1, 2016.
International Preliminary Report on Patentability for PCT Application No. PCT/US2014/052516, dated Sep. 1, 2016.
International Preliminary Report on Patentability for PCT Application No. PCT/US2014/052447, dated Sep. 1, 2016.
International Preliminary Report on Patentability for PCT Application No. PCT/US2015/015579, dated Sep. 1, 2016.
International Preliminary Report on Patentability for PCT Application No. PCT/US2015/015586, dated Sep. 1, 2016.
International Preliminary Report on Patentability for PCT Application No. PCT/US2014/052080, dated Sep. 1, 2016.
International Preliminary Report on Patentability for PCT Application No. PCT/US2015/016032 dated Sep. 1, 2016.
International Preliminary Report on Patentability for PCT Application No. PCT/US2015/015561 dated Sep. 1, 2016.
EP Search Report dated Jan. 24, 2017 for European Application No. 14883154.8.
EP Search Report dated Jan. 23, 2017 for European Application No. 14883117.5.
EP Search Report dated Jan. 24, 2017 for European Application No. 15752432.3.
EP Search Report dated Jan. 26, 2017 for European Application No. 15793425.8.
Partial EP Search Report dated Feb. 8, 2017 for European Application No. 15793193.2.
EP Search Report dated Feb. 9, 2017 for European Application No. 15752887.8.
EP Search Report dated Feb. 9, 2017 for European Application No. 14883515.0.
EP Search Report dated Jan. 30, 2017 for European Application No. 15752124.6.
EP Search Report dated Jan. 30, 2017 for European Application No. 15751498.5.
EP Search Report dated Feb. 3, 2017 for European Application No. 15751454.8.
EP Search Report dated Feb. 3, 2017 for European Application No. 15793323.5.
EP Search Report dated Feb. 3, 2017 for European Application No. 15796827.2.
EP Search Report dated Feb. 13, 2017 for European Application No. 15792194.1.
EP Search Report dated Feb. 13, 2017 for European Application No. 15751738.4.
EP Search Report dated Feb. 13, 2017 for European Application No. 15752593.2.
EP Search Report dated Feb. 13, 2017 for European Application No. 14883036.7.
EP Search Report dated Feb. 22, 2017 for European Application No. 15793112.2.
EP Search Report dated Feb. 20, 2017 for European Application No. 15793268.2.
Extended European Search Report for European Application No. 15792720.3 dated Jan. 31, 2018.
European Search Report for European Patent Application No. 14883170.4 dated Apr. 19, 2018.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.

(56) References Cited

OTHER PUBLICATIONS

Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., Macmartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003 . . . p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28 (9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76 (1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D. E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L, Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Leckie, F.A. and Dal Bello, D.J. (2009). Strength and stiffness of engineering systems. Mechanical Engineering Series. Springer. pp. 1-3.
El-Sayad, A.F. (2008). Aircraft propulsion and gas turbine engines. Boca Raton, FL: CRC Press. pp. 215-9 and 855-60.
Bunker, R.S. (2005). A review of shaped hole turbine film-cooling technology. Journal of Heat Transfer vol. 127. Apr. 2005. pp. 441-453.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-153.
Agarwal, B.D and Broutman, L.J. (1990). Analysis and performance of fiber composites, 2nd Edition. John Wiley & Sons, Inc. New York: New York. pp. 1-30, 50-1, 56-8, 60-1, 64-71, 87-9, 324-9, 436-7.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers,108(8), 65-67.

(56) References Cited

OTHER PUBLICATIONS

Faghri, A. (1995). Heat pipe and science technology. Washington, D.C. Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modem Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report. NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau K., Gu, C. and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko—Progress D-436. Jane's Aero-engines, Aero-engines—Turbofan. Feb. 8, 2012.
Ivchenko—Progress AI-727M. Jane's Aero-engines, Aero-engines—Turbofan. Nov. 27, 2011.
Ivchenko—Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Smith, L.,Yeh,H.,(1963).Sweep and Dihedral Effects in Axial-Flow Turbomachinery;Journal of Basic Engineering; Sep. 1963.pp. 401-416.
Engine Specifications. Engine Alliance GP7200—The Engine for the A380. Retrieved Feb. 19, 2015 from http://www.enginealliance.com/engine_specifications.html.
International Search Report and Written Opinion for PCT Application No. PCT/US2015/016018, dated Nov. 24, 2015.
International Search Report and Written Opinion for PCT Application No. PCT/US2015016091, dated Nov. 24, 2015.
International Search Report and Written Opinion for PCT Application No. PCT/US2015/016032, dated Nov. 24, 2015.
International Search Report and Written Opinion for PCT Application No. PCT/US2015/016135, dated Nov. 24, 2015.
International Search Report and Written Opinion for PCT Application No. PCT/US2015/016584, dated Nov. 24, 2015.
International Search Report and Written Opinion for PCT Application No. PCT/US2015/015561, dated Nov. 24, 2015.
International Search Report and Written Opinion for PCT Application No. PCT/US2015/015575, dated Nov. 24, 2015.
International Search Report and Written Opinion for PCT Application No. PCT/US2015/015579, dated Nov. 24, 2015.
International Search Report and Written Opinion for PCT Application No. PCT/US2015/015586, dated Nov. 24, 2015.

\* cited by examiner

GAS TURBINE ENGINE AIRFOIL

CROSS-REFERENCE TO RELATED APPLICATIONS

This application is a continuation on U.S. application Ser. No. 15/114,503 filed Jul. 27, 2016, which is a U.S. National Phase of International Application No. PCT/US2015/016135 filed Feb. 17, 2015, which claims priority to U.S. Provisional Application No. 61/941,617, which was filed on Feb. 19, 2014 and is incorporated herein by reference.

BACKGROUND

This disclosure relates to gas turbine engine airfoils. More particularly the disclosure relates to airfoil trailing edge angle in, for example, a gas turbine engine compressor.

A turbine engine such as a gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes at least low and high pressure compressors, and the turbine section includes at least low and high pressure turbines.

Direct drive gas turbine engines include a fan section that is driven directly by one of the turbine shafts. Rotor blades in the fan section and a low pressure compressor of the compressor section of direct drive engines rotate in the same direction.

Gas turbine engines have been proposed in which a geared architecture is arranged between the fan section and at least some turbines in the turbine section. The geared architecture enables the associated compressor of the compressor section to be driven at much higher rotational speeds, improving overall efficiency of the engine. The propulsive efficiency of a gas turbine engine depends on many different factors, such as the design of the engine and the resulting performance debits on the fan that propels the engine and the compressor section downstream from the fan. Physical interaction between the fan and the air causes downstream turbulence and further losses. Although some basic principles behind such losses are understood, identifying and changing appropriate design factors to reduce such losses for a given engine architecture has proven to be a complex and elusive task.

Prior compressor airfoil geometries may not be suitable for the compressor section of gas turbine engines using a geared architecture, since the significantly different speeds of the compressor changes the desired aerodynamics of the airfoils within the compressor section. Counter-rotating fan and compressor blades, which may be used in geared architecture engines, also present design challenges.

SUMMARY

In one exemplary embodiment, a compressor airfoil of a turbine engine having a geared architecture includes pressure and suction sides and extends in a radial direction from a 0% span position to a 100% span position. The airfoil has a relationship between a trailing edge angle and span position that defines a curve with a non-negative slope from 0% span to 20% span corresponding to a non-decreasing trailing edge angle.

In a further embodiment of the above, the curve has a non-negative slope from 0% span to 40% span.

In a further embodiment of any of the above, the curve has a non-negative slope from 0% span to 60% span.

In a further embodiment of any of the above, the curve has a non-negative slope from 0% span to 80% span.

In a further embodiment of any of the above, the curve has a non-negative slope from 0% span to 100% span.

In a further embodiment of any of the above, the curve has a positive slope from 0% span to 100% span.

In another exemplary embodiment, a gas turbine engine includes a combustor section arranged between a compressor section and a turbine section. A fan section has an array of twenty-six or fewer fan blades. The fan section has a low fan pressure ratio of less than 1.55. A geared architecture couples the fan section to the turbine section or the compressor section. An airfoil is arranged in the compressor section and includes pressure and suction sides and extends in a radial direction from a 0% span position to a 100% span position. The airfoil has a relationship between a trailing edge angle and span position that defines a curve with a non-negative slope from 0% span to 20% span corresponding to a non-decreasing trailing edge angle.

In a further embodiment of any of the above, the the compressor section includes at least a low pressure compressor and a high pressure compressor. The high pressure compressor is arranged immediately upstream of the combustor section.

In a further embodiment of any of the above, the airfoil is provided in a compressor outside the high pressure compressor.

In a further embodiment of any of the above, the low pressure compressor is counter-rotating relative to the fan blades.

In a further embodiment of any of the above, the gas turbine engine is a two-spool configuration.

In a further embodiment of any of the above, the low pressure compressor is immediately downstream from the fan section.

In a further embodiment of any of the above, the airfoil is fixed relative to an engine static structure.

In a further embodiment of any of the above, the curve has a non-negative slope from 0% span to 40% span.

In a further embodiment of any of the above, the curve has a non-negative slope from 0% span to 60% span.

In a further embodiment of any of the above, the curve has a non-negative slope from 0% span to 80% span.

In a further embodiment of any of the above, the curve has a non-negative slope from 0% span to 100% span.

In a further embodiment of any of the above, the curve has a positive slope from 0% span to 100% span.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
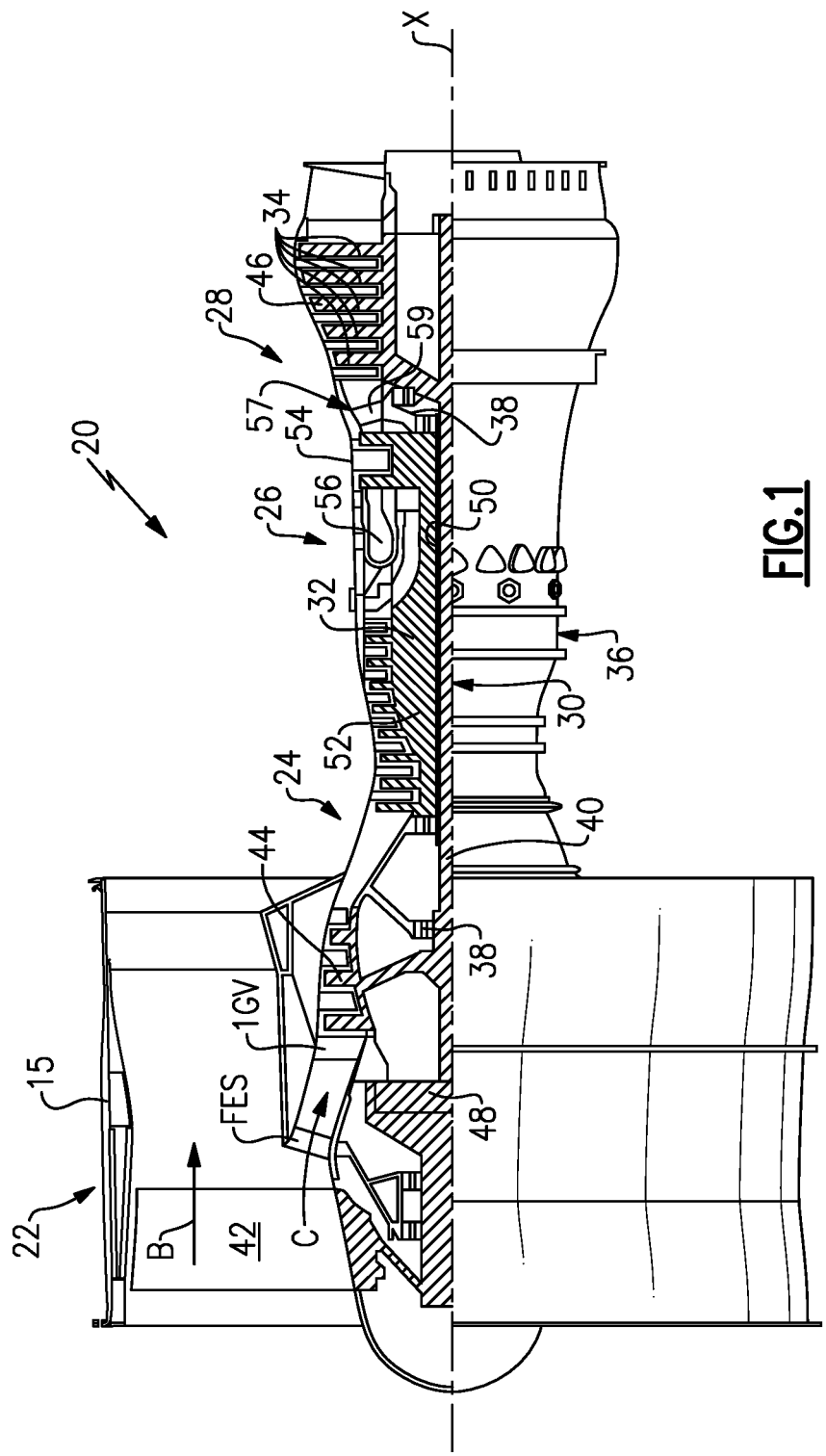
FIG. 1 schematically illustrates a gas turbine engine embodiment with a geared architecture.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. That is, the disclosed airfoils may be used for engine configurations such as, for example, direct fan drives, or two- or three-spool engines with a speed change mechanism coupling the fan with a compressor or a turbine sections.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicyclic gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.55. In another non-limiting embodiment the low fan pressure ratio is less than about 1.45. In another non-limiting embodiment the low fan pressure ratio is from 1.1 to 1.45. "Low corrected fan tip speed" is the actual fan tip speed in ft/sec divided by an industry standard temperature correction of [(Tram °

R)/(518.7 ° R)]$^{0.5}$. The "Low corrected fan tip speed" as disclosed herein according to one non-limiting embodiment is less than about 1200 ft/second (365.7 meters/second).

Figure 2:
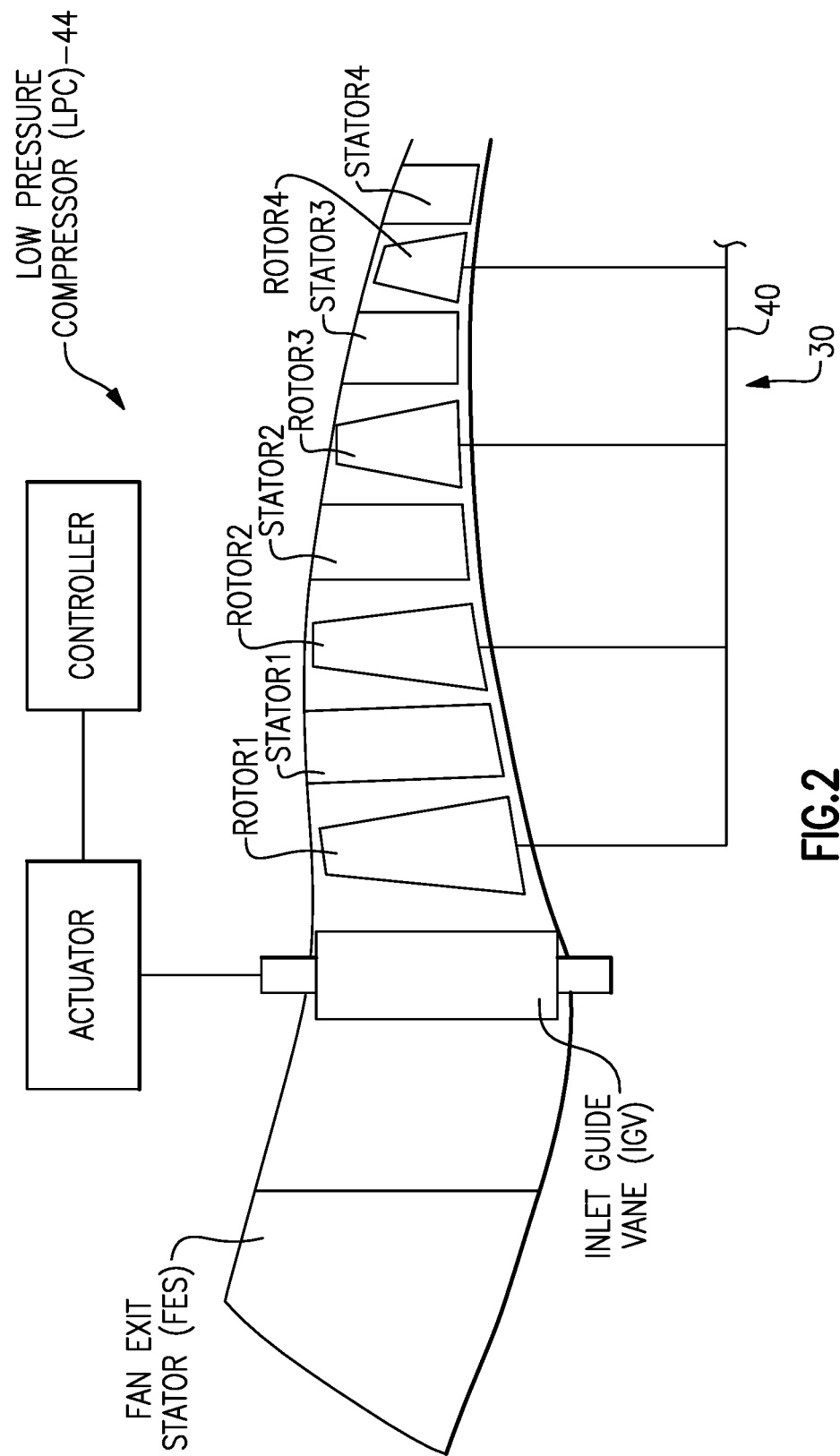
FIG. 2 schematically illustrates a low pressure compressor section of the gas turbine engine of FIG. 1.

Referring to FIG. 2, which schematically illustrates an example low pressure compressor (LPC) 44, a variable inlet guide vane (IGV) is arranged downstream from a fan exit stator (FES). The figure is highly schematic, and the geometry and orientation of various features may be other than shown. An actuator driven by a controller actuates the IGV about their respective axes. Multiple airfoils are arranged downstream from the IGV. The airfoils include alternating stages of rotors (ROTOR1, ROTOR2, ROTOR3, ROTOR4) and stators (STATOR1, STATOR2, STATOR3, STATOR4). In one example, the low pressure compressor is counter-rotating relative to the fan blades. In the example shown in FIG. 2, the LPC includes four rotors alternating with four stators. However, in another example, a different number of rotors and stators may be used. Moreover, the IGV and stator stages may all be variable, fixed or a combination thereof.

The disclosed airfoils may be used in a low pressure compressor of a two spool engine or in portions of other compressor configurations, such as low, intermediate and/or high pressure areas of a three spool engine. However, it should be understood that any of the disclosed airfoils may be used for blades or vanes, and in any of the compressor section, turbine section and fan section.

Figure 3:
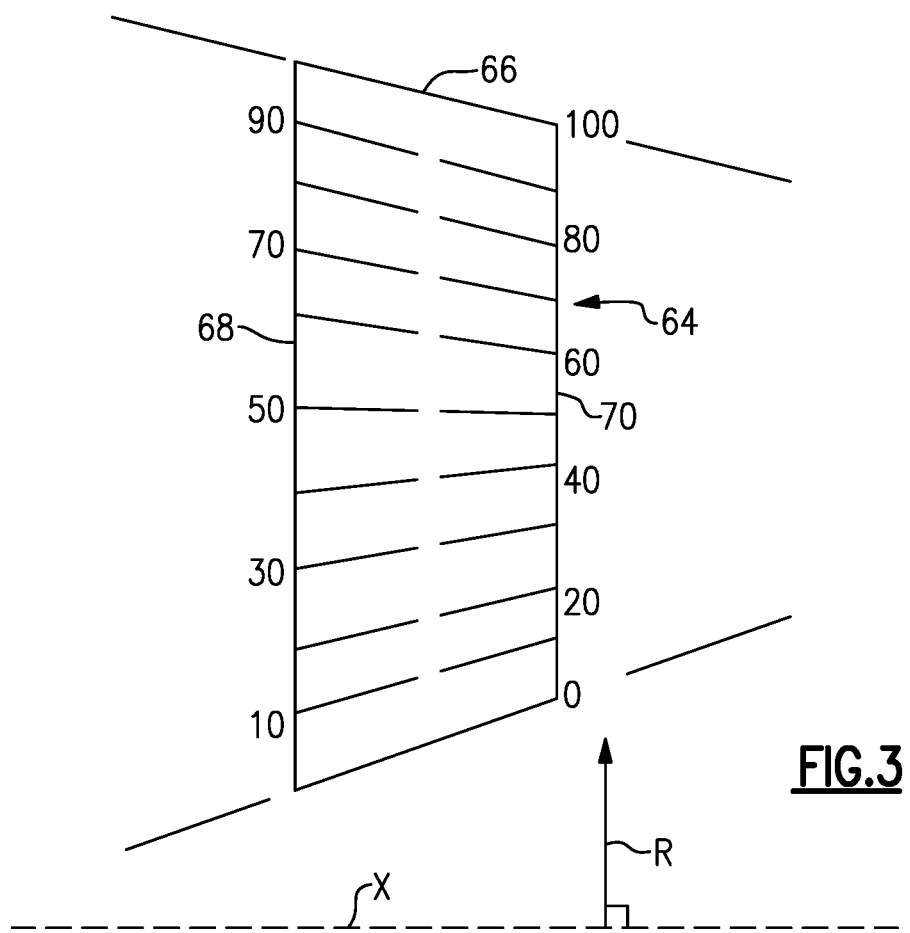
FIG. 3 is a schematic view of airfoil span positions.

Referring to FIG. 3, span positions on an airfoil 64 are schematically illustrated from 0% to 100% in 10% increments. Each section at a given span position is provided by a conical cut that corresponds to the shape of the core flow path, as shown by the large dashed lines. In the case of an airfoil with an integral platform, the 0% span position corresponds to the radially innermost location where the airfoil meets the fillet joining the airfoil to the inner platform. In the case of an airfoil without an integral platform, the 0% span position corresponds to the radially innermost location where the discrete platform meets the exterior surface of the airfoil. For airfoils having no outer platform, such as blades, the 100% span position corresponds to the tip 66. For airfoils having no platform at the inner diameter, such as cantilevered stators, the 0% span position corresponds to the inner diameter location of the airfoil. For stators, the 100% span position corresponds to the outermost location where the airfoil meets the fillet joining the airfoil to the outer platform.

Figure 4:
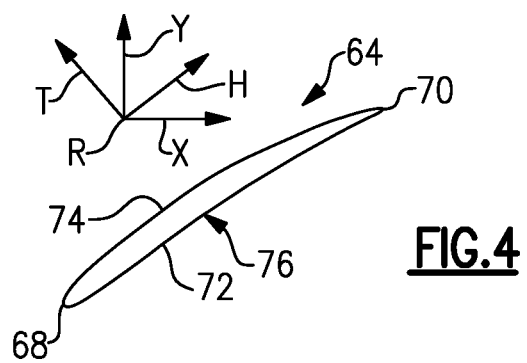
FIG. 4 is a schematic view of a cross-section of an airfoil sectioned at a particular span position and depicting directional indicators.

Airfoils in each stage of the LPC are specifically designed radially from an inner airfoil location (0% span) to an outer airfoil location (100% span) and along circumferentially opposite pressure and suction sides 72, 74 extending in chord between a leading and trailing edges 68, 70 (see FIG. 4). Each airfoil is specifically twisted with a corresponding stagger angle and bent with specific sweep and/or dihedral angles along the airfoil. Airfoil geometric shapes, stacking offsets, chord profiles, stagger angles, sweep and dihedral angles, among other associated features, are incorporated individually or collectively to improve characteristics such as aerodynamic efficiency, structural integrity, and vibration mitigation, for example, in a gas turbine engine with a geared architecture in view of the higher LPC rotational speeds.

The airfoil 64 has an exterior surface 76 providing a contour that extends from a leading edge 68 generally aftward in a chord-wise direction H to a trailing edge 70, as shown in FIG. 4. Pressure and suction sides 72, 74 join one another at the leading and trailing edges 68, 70 and are spaced apart from one another in an airfoil thickness direction T. An array of airfoils 64 are positioned about the axis X (corresponding to an X direction) in a circumferential or tangential direction Y. Any suitable number of airfoils may be used for a particular stage in a given engine application.

The exterior surface 76 of the airfoil 64 increases pressure based upon its geometry and directs flow along the core flow path C. The airfoil 64 may be constructed from a composite material, or an aluminum alloy or titanium alloy, or a combination of one or more of these. Abrasion-resistant coatings or other protective coatings may be applied to the airfoil. The rotor stages may constructed as an integrally bladed rotor, if desired, or discrete blades having roots secured within corresponding rotor slots of a disc. The stators may be provided by individual vanes, clusters of vanes, or a full ring of vanes.

Airfoil geometries can be described with respect to various parameters provided. The disclosed graph(s) illustrate the relationships between the referenced parameters within 10% of the desired values, which correspond to a hot aerodynamic design point for the airfoil. In another example, the referenced parameters are within 5% of the desired values, and in another example, the reference parameters are within 2% of the desired values. It should be understood that the airfoils may be oriented differently than depicted, depending on the rotational direction of the blades. The signs (positive or negative) used, if any, in the graphs of this disclosure are controlling and the drawings should then be understood as a schematic representation of one example airfoil if inconsistent with the graphs. The signs in this disclosure, including any graphs, comply with the "right hand rule."

Figure 5:
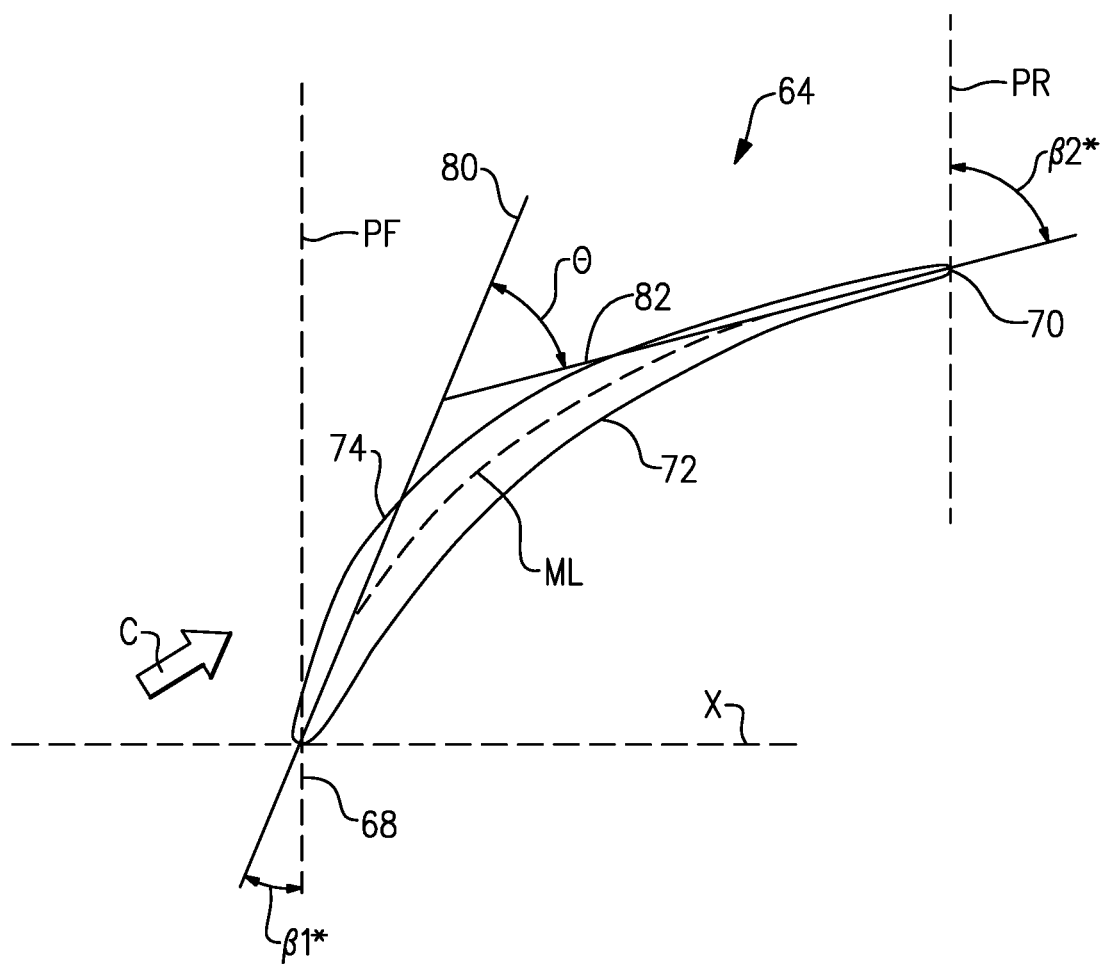
FIG. 5 is a schematic view of an airfoil depicting leading and trailing edge angles.

FIG. 5 shows an isolated airfoil 64. As shown, the airfoil 64 is sectioned at a radial position between the inner airfoil location (0% span) and the outer airfoil location (100% span). A camber mean line ML, or metal line, lies within the airfoil section and is equidistant between the exterior surface of the pressure and suction sides 72, 74. A line 80 is tangent to the camber mean line ML at the leading edge 68, and a line 82 is tangent to the camber mean line ML at the trailing edge 70. The angle between a tangential plane PF normal to the engine axis X and the line 80 is the leading edge angle β1*. The angle between a tangential plane PR normal to the engine axis X and the line 82 is the trailing edge angle (β2*. The camber angle θ, or total camber angle, is the angle between the lines 80, 82. The camber angle θ is the measure of the curve of the camber mean line ML and the airfoil 64. The leading and trailing edge angles β1*, β2* varies with position along the span, and varies between a hot, running condition and a cold, static ("on the bench") condition.

The geared architecture 48 of the disclosed example permits the fan 42 to be driven by the low pressure turbine 46 through the low speed spool 30 at a lower angular speed than the low pressure turbine 46, which enables the LPC 44 to rotate at higher, more useful speeds. The leading and trailing edge angles β1*, β2* in a hot, running condition along the span of the airfoils 64 provides necessary compressor operation in cruise at the higher speeds enabled by the geared architecture 48, to thereby enhance aerodynamic efficiency. As used herein, the hot, running condition is the condition during cruise of the gas turbine engine 20. For example, the leading and trailing edge angles β1*, β2* in the hot, running condition can be determined in a known manner using numerical analysis, such as finite element analysis.

Figure 6:
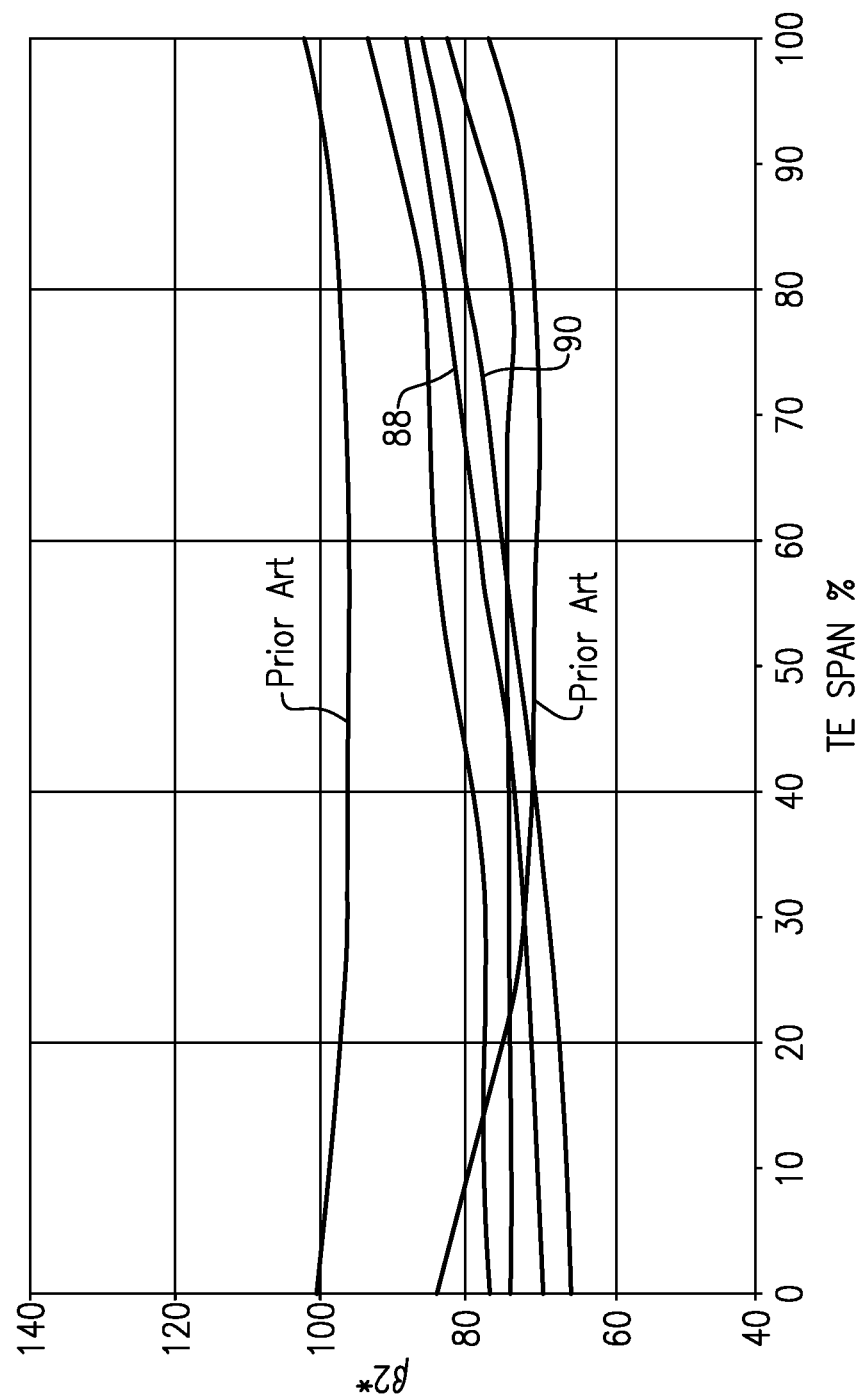
FIG. 6 graphically depicts curves for several example airfoil trailing edge angles relative to span, including two prior art curves and several inventive curves according to this disclosure.

FIG. 6 illustrates the relationship between the trailing edge angle β2* and the trailing edge span (TE SPAN %), which is the span position along the trailing edge 70. In one example, the airfoils are LPC stator blades. Two prior art curves ("PRIOR ART") are illustrated as well as several example inventive curves 88, 90. The airfoil 64 has a relationship between a trailing edge angle β2* and span position that defines a curve with a non-negative slope from 0% span to 20% span corresponding to a non-decreasing trailing edge angle. In the example, the curve has a non-negative slope from 0% span to at least 40% span, and as much as 60%, 80% span and up to 100% span. In one example, the curve has a positive slope from 0% span to 100% span. The trailing edge angle β2* does not decrease sharply near 0% span as in the prior art. Instead, the trailing edge angle β2* may remain relatively constant or have a slight increase near the inner flow path.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A compressor airfoil of a turbine engine comprising: pressure and suction sides extending in a radial direction from a 0% span position to a 100% span position, wherein the airfoil has a relationship between a trailing edge angle and span position that defines a non-linear curve with a non-negative slope from 0% span to 60% span corresponding to a non-decreasing trailing edge angle.

2. The compressor airfoil according to claim 1, wherein the curve has a non-negative slope from 0% span to 80% span.

3. The compressor airfoil according to claim 2, wherein the curve has a non-negative slope from 0% span to 100% span.

4. A compressor airfoil of a turbine engine comprising: pressure and suction sides extending in a radial direction from a 0% span position to a 100% span position, wherein the airfoil has a relationship between a trailing edge angle and span position that defines a curve with a positive slope from 0% span to 100% span.

5. A gas turbine engine comprising:
a combustor section arranged between a compressor section and a turbine section;
a fan section having an array of twenty-six or fewer fan blades; and
an airfoil arranged in the compressor section and including pressure and suction sides and extending in a radial direction from a 0% span position to a 100% span position, wherein the airfoil has a relationship between a trailing edge angle and span position that defines a non-linear curve with a non-negative slope from 0% span to 60% span corresponding to a non-decreasing trailing edge angle.

6. The gas turbine engine according to claim 5, wherein the compressor section includes at least a low pressure compressor and a high pressure compressor, the high pressure compressor arranged immediately upstream of the combustor section.

7. The gas turbine engine according to claim 6, wherein the airfoil is provided in a compressor outside the high pressure compressor.

8. The gas turbine engine according to claim 7, wherein the low pressure compressor is counter-rotating relative to the fan blades.

9. The gas turbine engine according to claim 7, wherein the gas turbine engine is a two-spool configuration.

10. The gas turbine engine according to claim 7, wherein the low pressure compressor is immediately downstream from the fan section.

11. The gas turbine engine according to claim 6, wherein the airfoil is fixed relative to an engine static structure.

12. The gas turbine engine according to claim 5, wherein the curve has a non-negative slope from 0% span to 80% span.

13. The gas turbine engine according to claim 12, wherein the curve has a non-negative slope from 0% span to 100% span.

14. The gas turbine engine according to claim 5, wherein the fan section has a low fan pressure ratio of less than 1.55.

15. A gas turbine engine comprising:
a combustor section arranged between a compressor section and a turbine section;
a fan section having an array of twenty-six or fewer fan blades; and
an airfoil arranged in the compressor section and including pressure and suction sides and extending in a radial direction from a 0% span position to a 100% span position, wherein the airfoil has a relationship between a trailing edge angle and span position that defines a curve with a positive slope from 0% span to 100% span.

16. The gas turbine engine according to claim 15, wherein the fan section has a low fan pressure ratio of less than 1.55.

* * * * *